United States Patent
Voyer et al.

(10) Patent No.: US 8,041,356 B2
(45) Date of Patent: Oct. 18, 2011

(54) DEVICE AND METHOD FOR ENABLING THE RECEPTION, BY A MOBILE TERMINAL LOCATED IN A MOVING CONVEYANCE, OF SIGNALS TRANSFERRED IN AT LEAST A FIRST AND A SECOND CELLS OF A WIRELESS CELLULAR TELECOMMUNICATION NETWORK

(75) Inventors: Nicolas Voyer, Rennes (FR); Herve Bonneville, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 795 days.

(21) Appl. No.: 12/030,642

(22) Filed: Feb. 13, 2008

(65) Prior Publication Data

US 2008/0194261 A1 Aug. 14, 2008

(30) Foreign Application Priority Data

Feb. 14, 2007 (EP) .................................. 07003075

(51) Int. Cl.
*H04W 36/00* (2009.01)

(52) U.S. Cl. ....................................... 455/436; 455/437
(58) Field of Classification Search .............. 455/432.1, 455/440, 441, 443, 448, 452.2, 456.3
See application file for complete search history.

(56) References Cited

U.S. PATENT DOCUMENTS

| 5,555,257 A * | 9/1996 | Dent ............................. 370/319 |
| 5,603,080 A * | 2/1997 | Kallander et al. .............. 455/14 |
| 6,381,458 B1 * | 4/2002 | Frodigh et al. ................ 455/442 |
| 6,952,587 B2 * | 10/2005 | Whikehart et al. ......... 455/456.1 |
| 2004/0233871 A1 * | 11/2004 | Seki et al. ..................... 370/331 |

FOREIGN PATENT DOCUMENTS

EP 1 282 327 A2 2/2003
WO WO 2005/053189 A1 6/2005
* cited by examiner

*Primary Examiner* — Lester Kincaid
*Assistant Examiner* — Joel Ajayi
(74) *Attorney, Agent, or Firm* — Oblon, Spivak, McClelland, Maier & Neustadt, L.L.P.

(57) ABSTRACT

A device assisting in reception, by a mobile terminal located in a moving conveyance, of signals transferred in at least a first cell and a second cell of a wireless cellular telecommunication network composed of plural base stations, the moving conveyance moving from a first area to a second area.

23 Claims, 4 Drawing Sheets

DEVICE AND METHOD FOR ENABLING THE RECEPTION, BY A MOBILE TERMINAL LOCATED IN A MOVING CONVEYANCE, OF SIGNALS TRANSFERRED IN AT LEAST A FIRST AND A SECOND CELLS OF A WIRELESS CELLULAR TELECOMMUNICATION NETWORK

BACKGROUND OF THE INVENTION

1. Field of the Invention

The present invention relates to a device and a method for enabling the reception, by a mobile terminal located in a moving conveyance, of signals transferred in at least a first and a second cells of a wireless cellular telecommunication network respectively by a first and a second base stations of the wireless cellular telecommunication network.

2. Description of Related Art

Wireless cellular telecommunication systems are widespread in the world. They offer the possibility to customers to continue a communication with a remote telecommunication device, even if they are moving, thanks to handover procedures between the base stations of the wireless cellular telecommunication system.

In some cases, especially when the mobile terminal is located in a moving conveyance which attenuates the propagation of electromagnetic waveforms, the communication is suddenly interrupted by a loss of the received electromagnetic signal or by unsuccessful handovers between the base stations of the wireless cellular telecommunication system.

Moving conveyances like elevators cabins attenuate the propagation of electromagnetic waveforms. Most of elevator cabins are built out of steel, or are contained in an elevator shaft made of concrete, which then forms a Faraday cage. No or strongly attenuated radio waveforms can penetrate into the elevator cabin from outside the elevator shaft or go out from the elevator cabin to the outside of the elevator cabin. When the doors of the elevator cabin are closing, the communication of the mobile terminal located inside the elevator cabin, drops, as they can no longer receive any signal from outside the elevator cabin. In addition, when the doors of the elevator cabin open abruptly, it causes significant quick variations of inter-cell interference, and brings associated degradation of the provided services within the wireless cellular telecommunication system.

In some other cases, especially when the mobile terminal is located in a moving conveyance like a train or a subway train which attenuates the propagation of electromagnetic waveforms, the communication is also suddenly interrupted by a loss of the received electromagnetic signal or by unsuccessful handovers between the base stations of the wireless cellular telecommunication system.

BRIEF SUMMARY OF THE INVENTION

The aim of the invention is therefore to propose a method and a system which make it possible, for a mobile terminal located in a moving conveyance, to establish and/or receive and/or continue a communication with a remote telecommunication device.

To that end, the present invention concerns a device for enabling the reception, by a mobile terminal located in a moving conveyance, of signals transferred in at least a first and a second cells of a wireless cellular telecommunication network composed of plural base stations, the moving conveyance moving from a first area to a second area, characterised in that the device for enabling the reception of signals comprises:

means for identifying a first base station which transfers signals in a first cell comprising the first area, means for identifying a second base station which transfers signals in a second cell comprising the second area, means for obtaining signals transferred in the first and the second cells by the first and second base stations, means for combining the obtained signals into combined signals, means for transferring the combined signals to the mobile terminal located in the moving conveyance.

The present invention concerns also a method for enabling the reception, by a mobile terminal located in a moving conveyance, of signals transferred in at least a first and a second cells of a wireless cellular telecommunication network composed of plural base stations, the moving conveyance moving from a first area to a second area, characterised in that the method for enabling the reception of signals comprises the steps of:

identifying a first base station which transfers signals in a first cell comprising the first area, identifying a second base station which transfers signals in a second cell comprising the second area, obtaining signals transferred in the first and the second cells by the first and second base stations, combining the obtained signals into combined signals, transferring the combined signals to the mobile terminal located in the moving conveyance.

Thus, even if the mobile terminal is located in a moving conveyance, the mobile terminal can receive the signals transferred by the first base station in the cell the mobile terminal was previously located in and the mobile terminal can receive the signals transferred by the second base station in the second cell the mobile terminal may be located in latter on.

According to a particular feature, the device further comprises:

means for obtaining information representative of the position of the moving conveyance, means for determining a first and a second coefficients from the information representative of the position of the moving conveyance, means for multiplying the signals transferred in the first cell by the first coefficient and for multiplying the signals transferred in the second cell by the second coefficient prior to combine the signals transferred in the first and second cells.

Thus, the mobile terminal which is located in the moving conveyance can monitor the signals transferred in the first and second cells. As the signals are respectively multiplied by first and second coefficients determined from the information representative of the position of the moving conveyance, the measurement of signals in the first and second cells made by the mobile terminal is representative of the position of the moving conveyance. The mobile terminal can then be prepared for an eventual handover procedure or a cell reselection process. When the moving conveyance is leaving the first area, the first coefficient value decreases and the second coefficient value increases. Thanks to these signals level modifications, the signals transferred in the first cell decreases, the signals transferred in the second cell increases so that the second base station becomes a good candidate for a handover or a cell reselection for the mobile terminal even if the moving conveyance is not arrived yet in the destination area.

According to a particular feature, the device further comprises:

means for obtaining signals transferred by the mobile terminal located in the moving conveyance, means for transferring to the first and second base stations the signals transferred by the mobile terminal located in the moving conveyance.

Thus, the signals transferred by the mobile terminal can be received by the first and second base stations during the motion of the moving conveyance. It is then possible to establish and/or receive and/or continue a communication with a remote telecommunication device.

According to a particular feature, the device further comprises:

means for determining a third and a fourth coefficients from the information representative of the position of the moving conveyance, means for multiplying the signals transferred to the first base station by the third coefficient and for multiplying the signals transferred to the second base station by the fourth coefficient, means for transferring the signals multiplied by the third coefficient to the first base station and the signals multiplied by the fourth coefficient to the second base station.

Thus, as the signals are respectively multiplied by third and fourth coefficients determined from the information representative of the position of the moving conveyance, the power of signals received by the first and second base stations are representative of the position of the moving conveyance. When the moving conveyance is leaving the first area, the third coefficient value decreases and the fourth coefficient value increases. Thanks to these signals power modifications, the signals transferred in the first cell decreases, the signals transferred in the second cell increases so that the second base station becomes a good candidate for an handover or a cell reselection for the mobile terminal even if the moving conveyance is not arrived yet in the destination area. The mobile terminal can then transfer measurement reports or cell reselection or handover notification to plural base stations.

According to a particular feature, the moving conveyance is an elevator cabin of a building, the combined signals transferred to the mobile terminal located in the moving conveyance are transferred through an antenna located in the elevator cabin, the signals transferred by the mobile terminal are obtained through the antenna, the first area is located in the origin floor at which the elevator cabin previously stopped and the second area is the destination floor of the elevator cabin.

Thus, even if the mobile terminal is located in an elevator cabin, the mobile terminal can receive the signals transferred by the first base station in the cell the mobile terminal was previously located in and the mobile terminal can receive the signals transferred by the second base station in the second cell the mobile terminal may be located in even if the door of the elevator cabin are closed.

According to a particular feature, the device further comprises means for receiving, from an elevator controller, information representative of the position of the destination of the elevator cabin.

Thus, the information representative of the position of the destination of the elevator cabin are accurate.

According to a particular feature, the first and third coefficients are determined from a variable $X_a$ calculated according to the following formula:

$$X_a = 0 \text{ if } |y_j - y| > |y_j - y_a|,$$

$$X_a = \left| \frac{y - y_a}{y_j - y_a} \right| \text{ if } |y_j - y| \le |y_j - y_a|$$

wherein $y$ is the position of the elevator cabin, $y_a$ is a first predetermined position and $y_j$ is the position of the destination floor.

Thus, the mobile terminal can smoothly detect transitions of signal levels between cells, and trigger handover or cell reselection when such levels cross some predetermined levels. With an appropriate choice of $y_a$, the quality of signal received from the base station located at the origin floor is maintained much after the closing of the doors of the elevator cabin at the origin floor. This gives additional time for completing the handover procedure to other cells prior to the reaching of the first predetermined position by the elevator cabin. With an appropriate choice or $y_a$, the quality of signal received from the base station located at the origin floor can be reduced before the opening of the doors of the elevator cabin at the destination floor. This minimises the level of interference in the destination floor produced by the base station located at the origin floor.

According to a particular feature, first and third coefficients are calculated according to the following formula:

$\text{coeff}_{DL1} = \text{coeff}_{UL1} = 1 - X_a$ wherein, $\text{coeff}_{DL1}$ is the first coefficient and $\text{coeff}_{UL1}$ is the third coefficient.

Thus, the values of the first and third coefficients are modified linearly.

According to a particular feature, the first and third coefficients are calculated according to the following formula:

$$\text{coeff}_{DL1} = \text{coeff}_{UL1} = 10^{-\Delta X_a/10},$$

with $\Delta$ is a predetermined value, $\text{coeff}_{DL1}$ is the first coefficient, and $\text{coeff}_{UL1}$ is the third coefficient.

Thus, the power of the signals, expressed in decibel, is modified linearly. The variations of the power levels of signals received by a mobile terminal located in the elevator cabin from base stations located outside the elevator cabin at different floors of the building reproduce the variations of the power levels of signals that are received from other base stations located at one same floor by other mobile terminal located outside the elevator cabin at that same floor and which is moving between these other base stations. The quality of communications and of handovers of mobile terminals located in the elevator cabin is then similar to usual quality of communications and of handovers of mobile terminals located outside the elevator cabin.

According to a particular feature, the first predetermined position is located between the position of the origin floor at which the elevator cabin previously stopped and the position of the destination floor or is a position at which information representative of the position of the destination of the elevator cabin have been received or is the position of the origin floor at which the elevator cabin previously stopped.

Thus, when the first predetermined position is located between the position of the origin floor at which the elevator cabin previously stopped and the position of the destination floor, it is possible, as example when the distance separating the origin and destination floors is large, to maintain a high transmission power of the signals transferred to and/or by the mobile terminal up to the arrival to the first predetermined position.

When the first predetermined position is a position at which information representative of the position of the destination of the elevator cabin have been received, it is possible to adjust the transmission power of the signals transferred to and/or by the mobile terminal as soon as the destination is known and then enabling a smooth modification of the first and third coefficients.

When the first predetermined position is the position of the origin floor at which the elevator cabin previously stopped, the first and third coefficients are modified smoothly.

According to a particular feature, the second and fourth coefficients are determined from a variable $X_b$ calculated according to the following formula:

$$X_b = 0 \text{ if } |y_j - y| > |y_j - y_b|,$$
$$X_b = \left|\frac{y - y_b}{y_j - y_b}\right| \text{ if } |y_j - y| \le |y_j - y_b|$$

wherein y is the position of the elevator cabin, $y_b$ is a second predetermined position and $y_j$ is the position of the destination floor.

Thus, the second base station can smoothly detect transitions of signal levels and trigger handover or cell reselection when such levels cross some predetermined levels. With an appropriate choice of $y_b$, the quality of signals received from the base station located at the destination floor is reduced much after the closing of the doors of the elevator cabin at the origin floor. This minimises the level of interference in the origin floor produced by the base station located at the destination floor. With an appropriate choice or $y_b$, the quality of signals received from the base station located at the destination floor can be raised before the opening of the doors of the elevator cabin at the destination floor. This gives additional time for completing the handover procedure with destination cell prior to the reaching of the position of the destination floor by the elevator cabin.

According to a particular feature, the second and fourth coefficients are calculated according to the following formula:

$\text{coeff}_{DLj} = \text{coeff}_{ULj} = X_b$ wherein, $\text{coeff}_{DLj}$ is the second coefficient and $\text{coeff}_{ULj}$ is the fourth coefficient.

Thus, the values of the second and fourth coefficients are modified linearly.

According to a particular feature, the second and fourth coefficients are calculated according to the following formula:

$$\text{coeff}_{DLj} = \text{coeff}_{ULj} = 10^{-\Delta(1-X_b)/10},$$

with $\Delta$ is a predetermined value, $\text{coeff}_{DLj}$ is the second coefficient and $\text{coeff}_{ULj}$ is the fourth coefficient.

Thus, the power of the signals, expressed in decibel, is modified linearly. The variations of the power levels of signals received by a mobile terminal located in the elevator cabin from base stations located outside the elevator cabin at different floors of the building reproduces the variations of the power levels of signals that are received from other base stations located at one same floor by other mobile terminal located outside the elevator cabin at that same floor and which is moving between these other base stations. The quality of communications and of handovers of mobile terminals located in the elevator cabin is similar to usual quality of communications and of handovers of mobile terminals located outside the elevator cabin.

According to a particular feature, the second predetermined position is located between the position of the origin floor at which the elevator cabin previously stopped and the position of the destination floor or is a position at which information representative of the position of the destination of the elevator cabin have been received or is the position of the origin floor at which the elevator cabin previously stopped.

Thus, when the second predetermined position is located between the position of the origin floor at which the elevator cabin previously stopped and the position of the destination floor, it is possible, as example when the distance separating the origin and destination floors is large, to avoid a transmission the signals transferred to and/or by mobile terminal up to the arrival to the second predetermined position.

When the second predetermined position is a position at which information representative of the position of the destination of the elevator cabin have been received, it is possible to adjust the transmission power of the signals transferred to and/or by the mobile terminal as soon as the destination is known and then enabling a smooth modification of the second and fourth coefficients.

When the second predetermined position is the position of the origin floor at which the elevator cabin previously stopped, the second and fourth coefficients are modified smoothly.

According to a particular feature, the building comprises a third floor in which a third base station transfers signals in a third cell and the device further comprises:

means for obtaining signals transferred in the third cell by the third base station,
means for determining a fifth coefficient from the information representative of the position of the elevator cabin,
means for multiplying the signals transferred in the third cell by the fifth coefficient,
and the signals multiplied by the fifth coefficient are combined to the combined signals.

Thus, even if the mobile terminal is located in a elevator cabin, the mobile terminal can receive the signals transferred by plural base stations, like the signals transferred in the cell the mobile terminal was previously located in, the signals transferred by the second base station in the second cell of the destination and the signals transferred in other cells like the one located in an intermediate floor or another destination floor that the elevator cabin will reach latter on.

According to a particular feature, the device further comprises:

means for determining a sixth coefficient from the information representative of the position of the elevator cabin,
means for multiplying the signals transferred by the mobile terminal by the sixth coefficient,
means for transferring the signals multiplied by the sixth coefficient to the third base station.

Thus, as the signals are respectively multiplied by fifth and sixth coefficients determined from the information representative of the position of the moving conveyance, the power of signals received by the third base station are representative of the position of the moving conveyance. Thanks to these signals power modifications, the third base station may become a good candidate for a handover or a cell reselection for the mobile terminal. The mobile terminal can then transfer measurement reports or cell reselection or handover notification to plural base stations.

According to a particular feature, the device further comprises means for receiving, from an elevator controller, information representative of the position of the third floor, the third floor being another destination floor of the elevator cabin next to the destination of the elevator cabin.

Thus, the device is informed of the other destination floor and can then determine coefficients a long time prior to the arrival of the elevator cabin to the other destination floor.

According to a particular feature, the fifth and sixth coefficients are determined from a variable $X_c$ calculated according to the following formula:

$$X_c = 0 \text{ if } |y_j - y| > |y_j - y_c|,$$

$$X_c = \left|\frac{y - y_c}{y_j - y_c}\right| \text{ if } |y_j - y| \le |y_j - y_c|$$

wherein y is the position of the elevator cabin, $y_c$ is a third predetermined position and $y_j$ is the position of the third floor.

Thus, the third base station or the mobile terminal can smoothly detect transitions of signal levels and trigger handover or cell reselection when such levels cross some predetermined levels. With an appropriate choice of $y_c$, the signals transferred by the base station located at third floor are received much after the closing of the doors of the elevator cabin at the origin floor. This minimises the level of interference in the origin floor produced by the base station located at the third floor. With an appropriate choice or $y_c$, the quality of signal received from the base station located at the third floor can be raised before the opening of the doors of the elevator cabin at the destination floor. This gives additional time for completing the handover procedure with the base station which transfers signals in the destination floor prior to the reaching of the position of the third floor by the elevator cabin.

According to a particular feature, the fifth and sixth coefficients are calculated according to the following formula:

$$\text{coeff}_{DL1} = \text{coeff}_{UL1} = X_c$$ wherein, $\text{coeff}_{DL1}$ is the fifth coefficient and $\text{coeff}_{UL1}$ is the sixth coefficient.

Thus, the values of the fifth and sixth coefficients are modified linearly.

According to a particular feature, the fifth and sixth coefficients are calculated according to the following formula:

$$\text{coeff}_{DL1} = \text{coeff}_{UL1} = 10^{-\Delta(1-X_c)/10},$$

with $\Delta$ is a predetermined value, $\text{coeff}_{DL1}$ is the fifth coefficient and $\text{coeff}_{UL1}$ is the sixth coefficient.

Thus, the power of the signals, expressed in decibel, is modified linearly. The variations of the power of signals received by a mobile terminal located in the elevator cabin from base stations located outside the elevator cabin at different floors of the building reproduce the variations of the power levels of signals that are received from other base stations located at one same floor by other mobile terminal located outside the elevator cabin at that same floor and which is moving between these other base stations. The quality of the communications and of handovers of mobile terminals located in the elevator cabin is similar to usual quality of communications and of handovers of mobile terminals located outside the elevator cabin.

According to a particular feature, the third predetermined position is located between the position of the origin floor at which the elevator cabin previously stopped and the position of the destination floor or is a position at which information representative of the position of the third floor have been received or is the position of the origin floor at which the elevator cabin previously stopped.

Thus, when the third predetermined position is located between the position of the origin floor at which the elevator cabin previously stopped and the position of the third floor, it is possible, as example when the distance separating the origin and third floors is large, to avoid a transmission the signals transferred to and/or by mobile terminal up to the arrival to the third predetermined position.

When the third predetermined position is a position at which information representative of the other destination of the moving conveyance have been received, it is possible to adjust the transmission power of the signals transferred to and/or by the mobile terminal as soon as the other destination is known and then enabling a smooth modification of the fifth and sixth coefficients.

When the third predetermined position is the position of the origin floor at which the elevator cabin previously stopped, the fifth and sixth coefficients are modified smoothly.

According to a particular feature, the third floor is not another destination floor next to the destination of the elevator cabin and the fifth and sixth coefficients are equal to null value.

Thus, the measurement of signals made by the mobile terminal, as example for an intermediate floor where the elevator cabin will not stop are not good. The mobile terminal can not be prepared for an eventual handover procedure or a cell reselection process with the third base station which transfers signals in an intermediate floor where the elevator cabin will not stop.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and devices according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION

Figure 1:
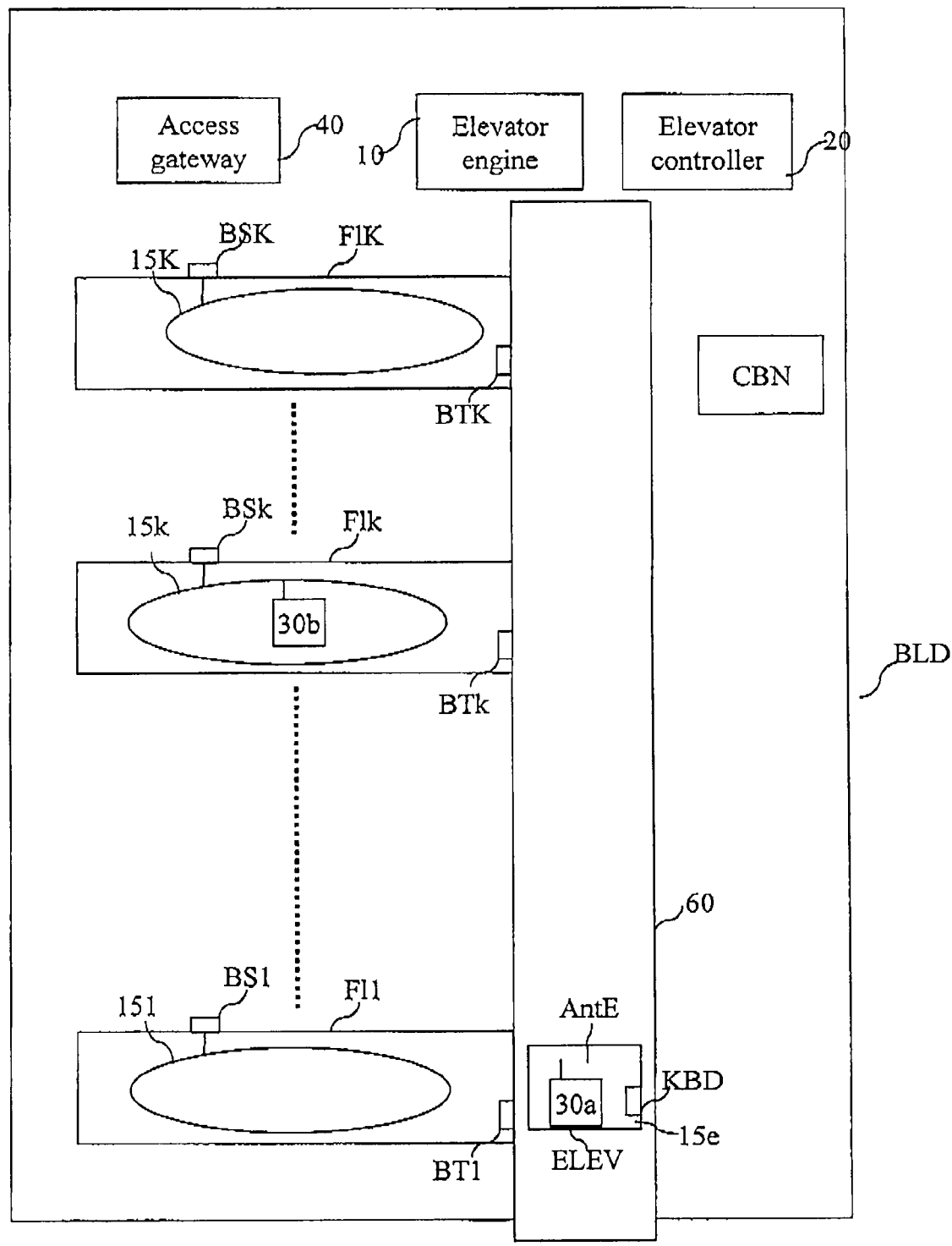
FIG. 1 is a diagram representing a view of a building comprising the wireless telecommunication system for a moving conveyance according to the present invention.

FIG. 1 is a diagram representing a view of a building comprising the wireless telecommunication system for a moving conveyance according to the present invention.

The present invention is disclosed using an example wherein the moving conveyance is an elevator cabin located in a building which moves from a floor of the building to another floor of the building. The present invention is also applicable to a train or a subway train which moves from a station to the next station.

The building BLD comprises an elevator shaft 60 in which an elevator cabin ELEV is displacing. The elevator cabin ELEV is moving, thanks to an elevator engine 10 controlled by an elevator controller 20, from one floor Flk, with k=1 to K to another floor Fli of the building BLD, with i=1 to K and i≠k, and where K is the number of floors of the building BLD.

Each floor Flk, with k=1 to K comprises at least one call button noted BTk, with k=1 to K which is linked to the elevator controller 20.

At least two floors Flk, with k=1 to K preferably comprise at least one base station BSk. Preferably and in a non limitative way, each floor Flk, with k=1 to K comprises at least one base station BSk. Each base station BSk enables the mobile terminals 30 which are located in the cell 15k managed by the base station BSk to establish or receive or continue a communication with a remote telecommunication device not shown in the FIG. 1.

It has to be noted here that, the cell 15k of a base station BSk may cover plural floors.

Three floors Fll, Flk and FlK are shown in the FIG. 1 for the sake of clarity. The base station BS1 manages the cell noted 15l, the base station BSk manages the cell noted 15k and the base station BSK manages the cell 15K. Only three floors Flk and three base stations BSk are shown in the FIG. 1, but we can understand that a more important number of floors Flk and base stations BSk are comprised in the building BLD In the FIG. 1, only two mobile terminals 30a and 30b are shown, but we can understand that a more important number of mobile terminals 30 is comprised in the building BLD. The mobile terminal 30a is located in the elevator cabin ELEV.

The elevator cabin ELEV comprises a keyboard KBD which enables the selection of at least one destination floor. The keyboard KBD is linked to the elevator controller 20.

From the keyboard KBD and the call buttons BT1 to BTK, the elevator controller 20 determines the destination floor Flk of the elevator cabin ELEV, gives related commands to the elevator engine 10 to pull the cabin to the destination floor, gives related orders to the elevator cabin ELEV to close and/or open the doors of the elevator cabin ELEV.

Each base station BSk, with k=1 to K is linked to a device for combining signals transferred in at least two cells located in different floors, named hereinafter a combiner CBN.

The base stations BSk, with k=1 to K are base stations of a wireless cellular telecommunication network.

Preferably, the base stations BSk, with i=1 to K are linked to an access gateway 40 which is linked to a telecommunication network not shown in the FIG. 1.

The telecommunication network is, as example and in a non limitative way, a dedicated wired network, part of public network like a public switched network, an IP based network, a wireless network, an Asynchronous Transfer Mode network or a combination of above cited networks.

The access gateway 40 is also named a Mobility Management Entity or a Serving GPRS Support Node or a Foreign Agent or a Visitor Location Register or a Public Land Mobile Network server.

The base stations BSk, with k=1 to K are also named a node or a node B or an enhanced node B or an access point.

The mobile terminals 30 are terminals like mobile phones, personal digital assistants, or personal computers.

The combiner CBN is, as example, located near the elevator server 20 or in the elevator cabin ELEV.

When a mobile terminal 30 is in idle mode, it has to continuously select the cell 15 in which it receives the strongest signals transferred by the base station BSi in order to be able to establish or receive a communication through that base station BSi. Such process is named a cell reselection process.

When a mobile terminal 30 is involved in an ongoing communication with a remote terminal, it has to continuously select the cell 15 in which it receives the strongest signals transferred by the base station BSi in order to be able to continue the ongoing communication through that base station. Such process is named a handover procedure.

Figure 2:
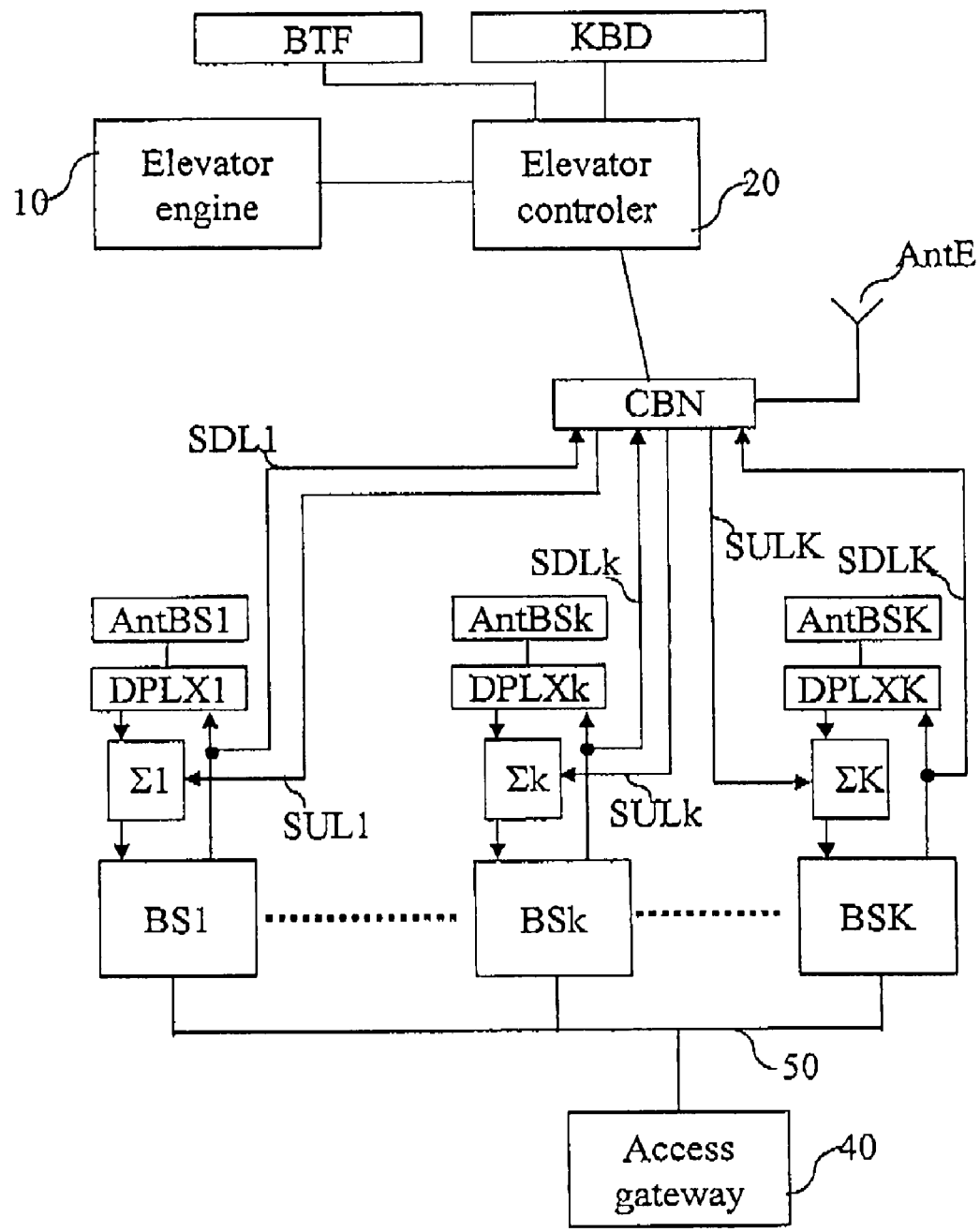
FIG. 2 is a block diagram depicting the interconnections between different devices of the wireless telecommunication system for a moving conveyance.

FIG. 2 is a block diagram depicting the interconnections between different devices of the wireless telecommunication system for a moving conveyance.

The elevator controller 20 is linked to the call buttons BT1 to BTK, the keyboard KBD, the elevator engine 10 through a dedicated wiring system.

From the keyboard KBD and the call buttons BT1 to BTK, the elevator controller 20 determines at least one destination floor Flk of the elevator cabin ELEV, commands the elevator engine 10 according to the determined destination in order to move the elevator cabin ELEV to the destination floor Flk.

The elevator controller 20 is also linked to the combiner CBN. According to the invention, the elevator controller 20 transfers messages to the combiner CBN indicating the destination floor Fli of the elevator cabin ELEV. In a variant of realisation, the messages comprise a list, preferably ordered of destination floors Fl.

The elevator controller 20 transfers also messages to the combiner CBN indicating if the elevator cabin ELEV is moving and if the elevator's doors are opened and transfers also, as example on a periodical basis, indication representative of the position of the elevator cabin ELEV in the shaft 60.

The base stations BS1 to BSK are linked together through a network 50. The network 50 is, as example and in a non limitative way, a dedicated wired network, part of public network like a public switched network, an IP based network, a wireless network, an Asynchronous Transfer Mode network or a combination of above cited networks.

The access gateway is also linked to the network 50.

The downlink signals SDL1 transferred by the base station BS1 to the mobile terminals 30 located in the cell 15l are transferred to a duplexer DPLX1 and to the combiner CBN.

The duplexer DPLX1 is connected to the antenna AntBS1 of the base station BS1, and transfers the downlink signal SDL1 to the antenna AntBS1, which radiates the downlink signal in the cell 15l.

The antenna AntBS1 also receives and relays to the duplexer DPLX1 the uplink signals received from the mobile terminals 30 located in the cell 15l.

The signals received from the mobile terminals 30 located in the cell 15l are transferred to a summation device Σ1 which sums the signals received from the mobile terminals 30 located in the cell 15l with a signal SUL1 generated by the combiner CBN. The summed signals are transferred to the reception module of the base station BS1.

The downlink signals SDLk transferred by the base station BSk to the mobile terminals 30 located in the cell 15k are transferred to a duplexer DPLXk and to the combiner CBN.

The duplexer DPLXk is connected to the antenna AntBSk of the base station BSk, and transfers the downlink signal SDLk to the antenna AntBSk, which radiates the downlink signal in the cell 15k.

The antenna AntBSk also receives and relays to the duplexer DPLXk the uplink signals received from the mobile terminals 30 located in the cell 15k.

The signals received from the mobile terminals 30 located in the cell 15k are transferred to a summation device Σk which sums the signals received from the mobile terminals 30 located in the cell 15k with a signal SULk generated by the combiner CBN. The summed signals are transferred to the reception module of the base station BSk.

The downlink signals SDLK transferred by the base station BSK to the mobile terminals 30 located in the cell 15K are transferred to a duplexer DPLXK and to the combiner CBN.

The duplexer DPLXK is connected to the antenna AntBSK of the base station BSK, and transfers the downlink signal SDLK to the antenna AntBSK, which radiates the downlink signal in the cell 15K.

The antenna AntBSK also receives and relays to the duplexer DPLXK the uplink signals received from the mobile terminals 30 located in the cell 15K.

The signals received from the mobile terminals 30 located in the cell 15K are transferred to a summation device ΣK which sums the signals received from the mobile terminals 30 located in the cell 15K with a signal SULK generated by the combiner CBN. The summed signals are transferred to the reception module of the base station BSK.

The combiner CBN is link to an antenna AntE which is located in the elevator cabin ELEV.

In a preferred mode of realisation of the invention, signals SDL1, SDLK, SDLK and SUL1, SULk, SULK are analogue RF or optical signals.

In another realisation mode of the invention, signals SDL1, SDLk, SDLK and SUL1, SULk, SULK are digital baseband signals, and duplexers DPLX1, DPLXk, DPLXK also contain means for converting digital baseband signals from/to RF or optical signals.

Figure 3:
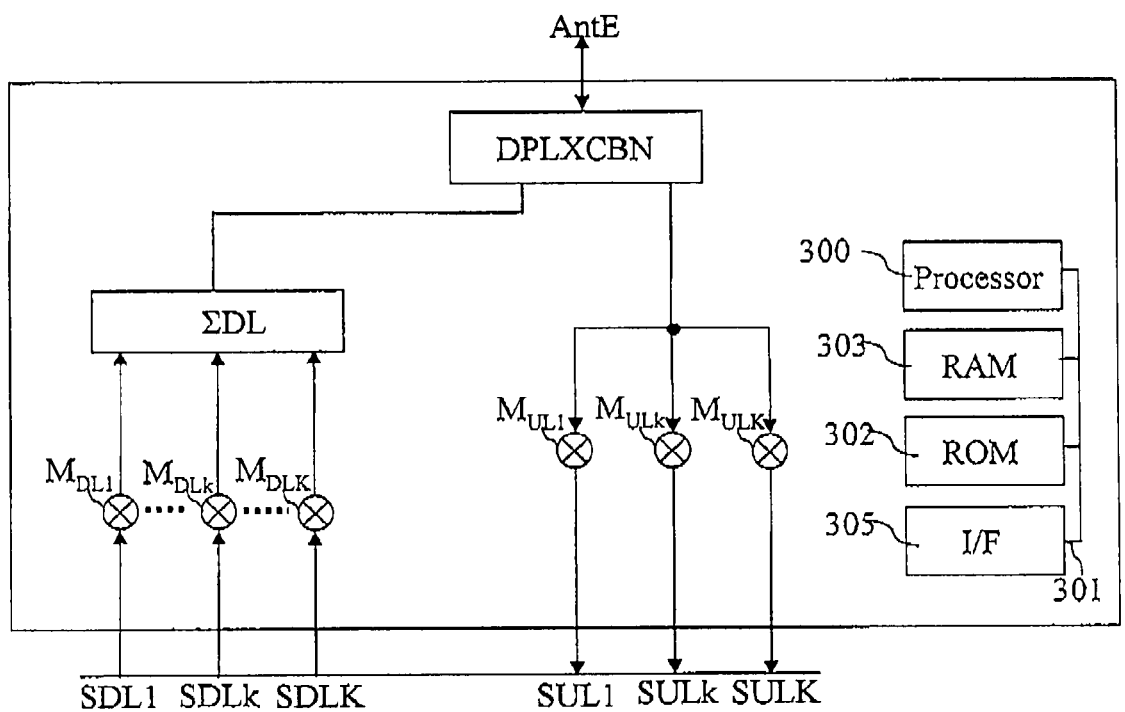
FIG. 3 is a block diagram of a device for combining signals transferred in at least two cells located in different floors according to the present invention.

FIG. 3 is a block diagram of the combiner according to the present invention.

The combiner CBN receives the downlink signals SDL1 to SDLK respectively from the base stations BS1 to BSK.

The downlink signals SDL1 to SDLK are respectively multiplied with a respective coefficient $coeff_{DL1}$ to $coeff_{DLK}$ by multipliers $M_{DL1}$ to $M_{DLK}$.

The multiplied signals are summed by a summation circuit ΣDL. The summed signals are transferred to a duplexer DPLXCBN which is connected to the antenna AntE which radiates the summed signals into the elevator cabin ELEV.

The signals emitted by the mobile terminals 30 located in the elevator cabin ELEV are received by the Antenna AntE and transferred to the duplexer DPLXCBN.

The signals emitted by the mobile terminals 30 located in the elevator cabin ELEV are K times duplicated.

The duplicated signals are respectively multiplied with a respective coefficient $coeff_{UL1}$ to $coeff_{ULK}$ by multipliers $M_{UL1}$ to $M_{ULK}$ in order to form the respective signals SDL1 to SDLK.

Figure 4:
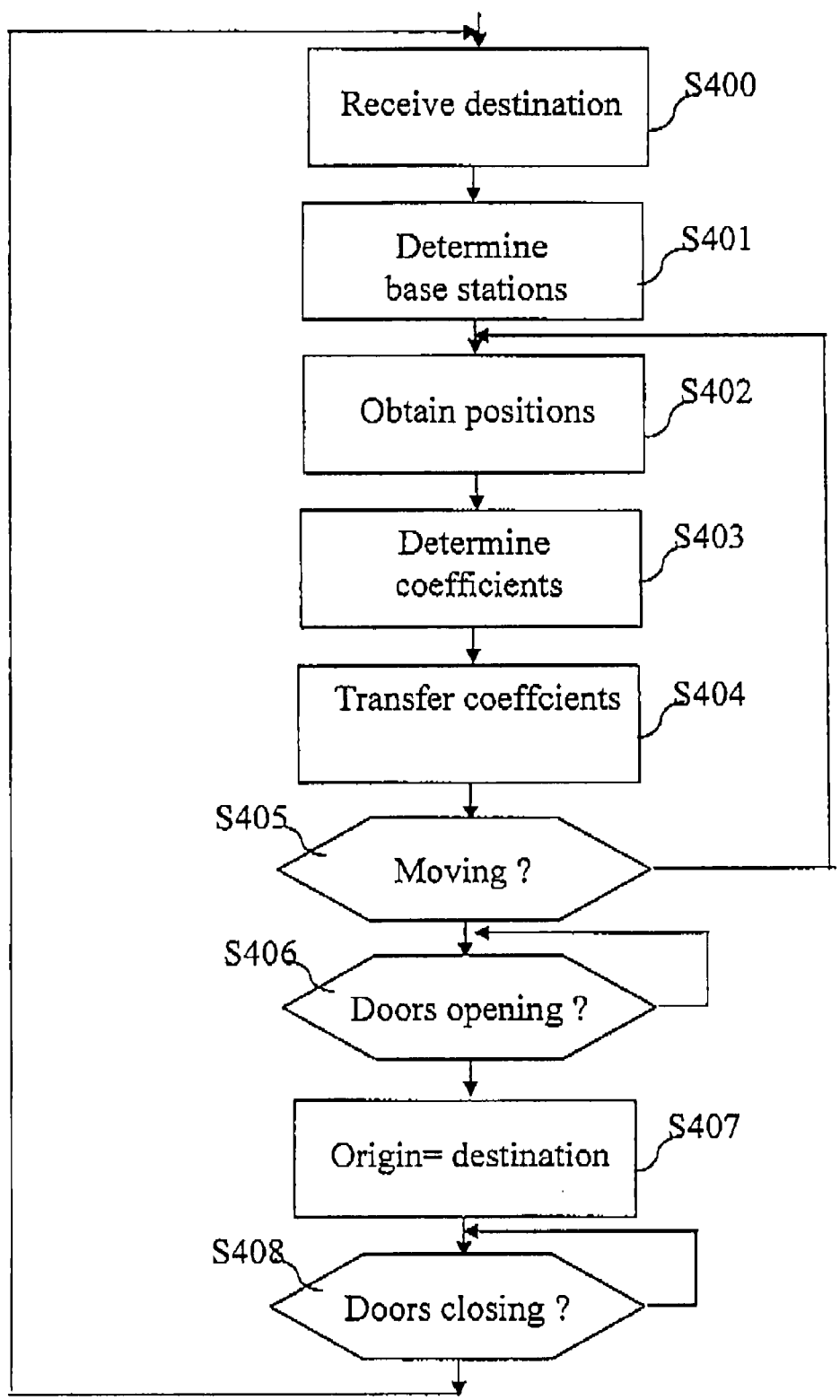
FIG. 4 represents an algorithm executed by a device for combining signals transferred in at least to cells located in different floors according to the present invention.

The combiner CBN further comprises components connected together by a bus 301 and a processor 300 controlled by the program as disclosed in the FIG. 4.

The bus 301 links the processor 300 to a read only memory ROM 302, a random access memory RAM 303 and an elevator interface 305.

It has to be noted here that the processor 300, the read only memory ROM 302, the random access memory RAM 303 in a variant, implemented under the form of one or several dedicated integrated circuits which execute the same operations as the one executed by the processor 300 as disclosed hereinafter.

It has to be noted that tasks completed by multipliers $M_{UL1}$ to $M_{ULK}$ and $M_{DL1}$ to $M_{DLK}$ are, in a variant, realised as instructions by the processor 300.

The memory 303 contains registers intended to receive variables, and the instructions of the programs related to the algorithm as disclosed in the FIG. 4.

The read only memory 302 contains the instructions of the programs implementing the algorithm of the FIG. 4.

Through the elevator interface 305, the processor 300 receives from the elevator controller 20, messages indicating the destination floor Fli of the elevator cabin ELEV. In a variant of realisation, the messages comprise a list, preferably ordered of destination floors Fl.

Through the elevator interface 405, the processor 400 receives also messages indicating if the elevator cabin ELEV is moving, the location of the elevator cabin, or the relative position of the cabin between the origin floor and the destination floor, the location of the origin and destination floor, and if the doors of the elevator cabin ELEV are opened.

According to the invention, the processor 300 determines, using the messages receives from the elevator controller 20, the coefficients $coeff_{UL1}$ to $coeff_{ULK}$ and $coeff_{DL1}$ to $coeff_{DLK}$.

FIG. 4 represents an algorithm executed by a device for combining signals transferred in at least to cells located in different floors according to the present invention.

The present algorithm is more precisely executed by the processor 300 of the combiner CBN.

At step S400, the processor 300 checks the reception, through the elevator interface 305, of a message transferred by the elevator controller 20 indicating the destination floor of the elevator cabin ELEV or comprising the list, preferably ordered, of destination floors Fl.

When a message is received at step S400, which indicates the destination floor of the elevator cabin ELEV, or the received list of destination floors Fl, its content is stored in memory RAM 303.

At next step S401, the processor 300 identifies at least a first and a second base stations.

The first base station is the base station BSi which transfers signals in the cell comprising the origin floor Fli.

The second base station is the base station BSj which transfers signals in the cell comprising the destination floor Flj.

When the message received at step S400 comprises a list of L destination floors $Flj_1$, $Flj_2$ to $Flj_L$ the processor 300 identifies at least a first, a second and a third base stations.

The first base station is the base station BSi which transfers signals in the cell comprising the origin floor Fli.

The second base station is the base station which transfers signals in the cell comprising the destination floor $Flj_1$.

The third base station is the base station which transfers signals in the cell comprising the destination floor $Flj_2$.

At next step S402, the processor 300 obtains the position of the elevator cabin ELEV in the shaft, the position of the origin floor at which the elevator cabin ELEV previously stopped and the position of the destination floor, or $X_a$, $X_b$ and $X_c$ disclosed hereinafter.

According to the third mode of realisation of the present invention, the processor 300 memorizes the position of the elevator cabin ELEV at which the message is received.

Each position is transferred by the elevator controller 20.

As example, each position is a coordinate expressed in meter from on the first floor FL1 of the building BLD.

At next step S403, the processor 300 determines the coefficients $coeff_{UL1}$ to $coeff_{ULK}$ and $coeff_{DL1}$ to $coeff_{DLK}$.

The first and the third coefficients are determined from a from a variable $X_a$ calculated according to the following formula:

$$X_a = 0 \text{ if } |y_j - y| > |y_j - y_a|,$$

$$X_a = \left|\frac{y - y_a}{y_j - y_a}\right| \text{ if } |y_j - y| \leq |y_j - y_a|$$

wherein y is the position of the elevator cabin, $y_a$ is a first predetermined position and $y_j$ is the position of the destination floor Flj.

According to the first mode of realisation of the present invention, the first predetermined position is located between the position of the origin floor Fli at which the elevator cabin previously stopped and the position of the destination floor FLj.

According to the second mode of realisation of the present invention, the first predetermined position is a position at which information representative of the position of the destination of the elevator cabin have been received.

According to the third mode of realisation of the present invention, the first predetermined position is the position of the origin floor Fli at which the elevator cabin previously stopped.

According to a first variant of the first, second and third modes of realisation, the first and third coefficients are equal to:

$\text{coeff}_{DL1} = \text{coeff}_{UL1} = 1 - X_a$, wherein $\text{coeff}_{DL1}$ is the first coefficient used for multiplying the signals transferred in the first cell by the base station BSi, $\text{coeff}_{UL1}$ is the third coefficient used for multiplying the signals transferred to the base station BSi.

According to a second variant of the first, second and third modes of realisation, the first and third coefficients are equal to:

$\text{coeff}_{DL1} = \text{coeff}_{UL1} = 10^{-\Delta x_a/10}$, wherein $\Delta$ is a predetermined value.

The second and fourth coefficients are determined from a variable $X_b$ calculated according to the following formula:

$$X_b = 0 \text{ if } |y_j - y| > |y_j - y_b|,$$

$$X_b = \left|\frac{y - y_b}{y_j - y_b}\right| \text{ if } |y_j - y| \leq |y_j - y_b|$$

wherein $y_b$ is a second predetermined position.

According to the first mode of realisation of the present invention, the second predetermined position is located between the position of the origin floor Fli at which the elevator cabin previously stopped and the position of the destination floor FLj.

According to the second mode of realisation of the present invention, the second predetermined position is a position at which information representative of the position of the destination of the elevator cabin have been received.

According to the third mode of realisation of the present invention, the second predetermined position is the position of the origin floor Fli at which the elevator cabin previously stopped.

According to a first variant of the first, second and third modes of realisation, the second and fourth coefficients are equal to:

$\text{coeff}_{DLj} = \text{coeff}_{ULj} = X_b$ wherein, $\text{coeff}_{DLj}$ is the second coefficient used for multiplying the signals transferred in the first cell by the base station BSj and $\text{coeff}_{ULj}$ is the fourth coefficient used for multiplying the signals transferred to the base station BSj.

The fifth, sixth and other coefficients are determined as follow: $\text{coeff}_{DLk} = \text{coeff}_{ULk} = 0, \forall k \notin \{i,j\}$.

According to a second variant of the first, second and third modes of realisation, the first and third coefficients are equal to:

$\text{coeff}_{DLj} = \text{coeff}_{ULj} = 10^{-\Delta(1-X_b)/10}$ wherein, $\text{coeff}_{DLj}$ is the second coefficient used for multiplying the signals transferred in the first cell by the base station BSj and $\text{coeff}_{ULj}$ is the fourth coefficient used for multiplying the signals transferred to the base station BSj.

The fifth, sixth and other coefficients are determined as follow: $\text{coeff}_{DLk} = \text{coeff}_{ULk} = 0, \forall k \notin \{i,j\}$.

When the message received at step S400 comprises a list of L destination floors $Flj_1$, $Flj_2$ to $Flj_L$, the first, second, third and fourth coefficients to be used for the origin floor Fli and the first destination floor $Flj_1$ of the list are determined as described previously. The fifth and sixth coefficients to be used for second destination floor $Flj_2$ of the list are determined as follow:

$$X_c = 0 \text{ if } |y_j - y| > |y_j - y_c|,$$

$$X_c = \left|\frac{y - y_c}{y_j - y_c}\right| \text{ if } |y_j - y| \leq |y_j - y_c|$$

wherein $y_c$ is a third predetermined position.

According to the first mode of realisation of the present invention, the third predetermined position is located between the position of the origin floor Fli at which the elevator cabin previously stopped and the position of the destination floor $FLj_2$.

According to the second mode of realisation of the present invention, the third predetermined position is a position at which information representative of the position of the floor $FLj_2$ have been received.

According to the third mode of realisation of the present invention, the third predetermined position is the position of the origin floor Fli at which the elevator cabin previously stopped.

According to a first variant of the first, second and third modes of realisation, the fifth and sixth coefficients are equal to:

$\text{coeff}_{DLj2} = \text{coeff}_{ULj2} = X_c$ wherein, $\text{coeff}_{DLj2}$ is the fifth coefficient used for multiplying the signals transferred in the third cell by the base station $BSj_2$ and $\text{coeff}_{ULj2}$ is the sixth coefficient used for multiplying the signals transferred to the base station $BSj_2$.

The other coefficients are determined as follow: $\text{coeff}_{DLk} = \text{coeff}_{ULk} = 0, \forall k \notin \{\text{origin}\} \cup \{j_l\}$, with $l=1$ to L.

According to a second variant of the first, second and third modes of realisation, the first and third coefficients are equal to:

$\text{coeff}_{DLj2} = \text{coeff}_{ULj2} = 10^{-\Delta(1-X_c)/10}$ wherein, $\text{coeff}_{DL2}$ is the fifth coefficient used for multiplying the signals transferred in the first cell by the base station $BSj_2$ and $\text{coeff}_{ULj2}$ is the sixth coefficient used for multiplying the signals transferred to the base station $BSj_2$.

The other coefficients are determined as follow: $\text{coeff}_{DLk} = \text{coeff}_{ULk} = 0, \forall k \notin \{\text{origin}\} \cup \{j_l\}$, with $l=1$ to L.

It has to be noted also, that in a variant the coefficients to be applied on signals transferred to or received from base stations BS which transfer signals in the third, the fourth or more destination floor comprised in the ordered list can be calculated on a similar way as the one disclosed the fifth and sixth coefficients instead of being set to null value.

At next step S404, the processor 400 transfers the coefficients $\text{coeff}_{UL1}$ to $\text{coeff}_{ULK}$ and $\text{coeff}_{DL1}$ to $\text{coeff}_{DLK}$ to the multipliers $M_{UL1}$ to $M_{ULK}$ and $M_{UL1}$ to $M_{ULK}$.

At next step S405, the processor 300 checks if the elevator cabin ELEV is moving. The elevator controller 20 transfers messages to the combiner CBN indicating if the elevator cabin ELEV is moving or if the elevator cabin ELEV stops.

If the elevator cabin ELEV is moving, the processor 300 returns to steps S402. The processor 300 executes the loop constituted by the steps S402 to S404 and modifies the coefficients coeff$_{UL1}$ to coeff$_{ULK}$ and coeff$_{DL1}$ to coeff$_{DLK}$ according to the received position of the elevator cabin ELEV.

If the elevator cabin ELEV is stops, the processor 300 moves to step S406.

At step S406, the processor 300 checks if a message indicating that the doors of the elevator ELEV are opening is received from the elevator controller 20.

If a message indicating that the doors of the elevator ELEV are opening is received, the processor 300 moves to step S407. Otherwise, the processor 300 returns to step S406.

At step S407, the processor 300 sets the position of the origin floor as position of the destination floor at which the elevator cabin ELEV stopped at step S406 i.e. sets the value of the variable $y_i$ at the value of the variable $y_j$.

The processor 300 also sets the position of the destination floor as the position of the next destination floor i.e. sets the value of the variable $y_j$ at the value of the variable $y_{l+1}$ which is the next destination floor in the list of destination floors. The processor 300 sets the new origin floor as the destination floor at which the elevator cabin ELEV stopped at step S406, removes the destination floor at which the elevator cabin ELEV stopped at step S406 from the list of destination floors.

At next step S408, the processor 300 checks if a message indicating that the doors of the elevator ELEV are closing is received from the elevator controller 20.

If a message indicating that the doors of the elevator ELEV are closing is received, the processor 300 returns to step S400. Otherwise, the processor 300 returns to step S408.

After that, the processor 300 returns to step S400.

Naturally, many modifications can be made to the embodiments of the invention described above without departing from the scope of the present invention.

The invention claimed is:

1. A device assisting in reception, by a mobile terminal located in a moving conveyance, of signals transferred in at least a first cell and a second cell of a wireless cellular telecommunication network composed of plural base stations, the moving conveyance moving from a first area to a second area, the device configured to:
identify a first base station which transfers signals in a first cell comprising the first area, identify a second base station which transfers signals in a second cell comprising the second area, obtain information representative of the position of the moving conveyance relative to its destination, determine a first coefficient and a second coefficient from the information representative of the position of the moving conveyance, obtain signals transferred in the first and the second cells by the first and second base stations, multiply the signals transferred in the first cell by the first coefficient and multiply the signals transferred in the second cell by the second coefficient, combine the multiplied signals into combined signals, and transfer the combined signals to the mobile terminal located in the moving conveyance.

2. The device according to claim 1, further configured to:
obtain signals transferred by the mobile terminal located in the moving conveyance, and
transfer to the first and second base stations the signals transferred by the mobile terminal located in the moving conveyance.

3. A device assisting in reception, by a mobile terminal located in a moving conveyance, of signals transferred in at least a first cell and a second cell of a wireless cellular telecommunication network composed of plural base stations, the moving conveyance moving from a first area to a second area, the device configured to:
identify a first base station which transfers signals in a first cell comprising the first area, identify a second base station which transfers signals in a second cell comprising the second area, obtain information representative of the position of the moving conveyance relative to its destination, determine a first coefficient and a second coefficient from the information representative of the position of the moving conveyance, obtain signals transferred in the first and the second cells by the first and second base stations, multiply the signals transferred in the first cell by the first coefficient and multiply the signals transferred in the second cell by the second coefficient, combine the multiplied signals into combined signals, transfer the combined signals to the mobile terminal located in the moving conveyance, obtain signals transferred by the mobile terminal located in the moving conveyance, determine a third coefficient and a fourth coefficient from the information representative of the position of the moving conveyance, multiply the signals transferred to the first base station by the third coefficient and multiply the signals transferred to the second base station by the fourth coefficient, and transfer the signals multiplied by the third coefficient to the first base station and the signals multiplied by the fourth coefficient to the second base station.

4. The device according to claim 3, wherein the moving conveyance is an elevator cabin of a building, the combined signals transferred to the mobile terminal located in the moving conveyance are transferred through an antenna located in the elevator cabin, the signals transferred by the mobile terminal are obtained through the antenna, the first area is located in an origin floor at which the elevator cabin previously stopped and the second area is a destination floor of the elevator cabin.

5. The device according to claim 4, further configured to receive, from an elevator controller, information representative of the position of the destination of the elevator cabin.

6. The device according to claim 5, wherein the first and third coefficients are determined from a variable $X_a$ calculated according to the following formula:

$$X_a = 0 \text{ if } |y_j - y| > |y_j - y_a|,$$
$$X_a = \left|\frac{y - y_a}{y_j - y_a}\right| \text{ if } |y_j - y| \le |y_j - y_a|$$

wherein y is the position of the elevator cabin, $y_a$ is a first predetermined position and $y_j$ is the position of the destination floor.

7. The device according to claim 6, wherein the first and third coefficients are calculated according to the following formula:
coeff$_{DLi}$=coeff$_{ULi}$=1−$X_a$ wherein, coeff$_{DLi}$ is the first coefficient and coeff$_{ULi}$ is the third coefficient.

8. The device according to claim 6, wherein the first and third coefficients are calculated according to the following formula:

$$\text{coeff}_{DLi} = \text{coeff}_{ULi} = 10^{-\Delta X_a/10},$$

with $\Delta$ is a predetermined value, coeff$_{DLi}$ is the first coefficient, and coeff$_{ULi}$ is the third coefficient.

9. The device according to claim 6, wherein the first predetermined position is located between the position of the origin floor at which the elevator cabin previously stopped and the position of the destination floor or is a position at which information representative of the position of the destination of the elevator cabin have been received or is the position of the origin floor at which the elevator cabin previously stopped.

10. The device according to claim 6, wherein the second and fourth coefficients are determined from a variable $X_b$ calculated according to the following formula:

$$X_b = 0 \text{ if } |y_j - y| > |y_j - y_b|,$$

$$X_b = \left|\frac{y - y_b}{y_j - y_b}\right| \text{ if } |y_j - y| \leq |y_j - y_b|$$

wherein y is the position of the elevator cabin, $y_b$ is a second predetermined position and $y_j$ is the position of the destination floor.

11. The device according to claim 10, wherein the second and fourth coefficients are calculated according to the following formula:
coeff$_{DLj}$=coeff$_{ULj}$=$X_b$ wherein, coeff$_{DLj}$ is the second coefficient and coeff$_{ULj}$ is the fourth coefficient.

12. The device according to claim 11, wherein the second and fourth coefficients are calculated according to the following formula:

$$\text{coeff}_{DLj} = \text{coeff}_{ULj} = 10^{-\Delta(1-X_b)/10},$$

with $\Delta$ is a predetermined value, coeff$_{DLj}$ is the second coefficient and coeff$_{ULj}$ is the fourth coefficient.

13. The device according to claim 10, wherein the second predetermined position is located between the position of the origin floor at which the elevator cabin previously stopped and the position of the destination floor or is a position at which information representative of the position of the destination of the elevator cabin have been received or is the position of the origin floor at which the elevator cabin previously stopped.

14. The device according to claim 10, wherein the building comprises a third floor in which a third base station transfers signals in a third cell and in that the device is further configured to:
obtain signals transferred in the third cell by the third base station,
determine a fifth coefficient from the information representative of the position of the elevator cabin,
multiply the signals transferred in the third cell by the fifth coefficient, and
the signals multiplied by the fifth coefficient are combined with the combined signals.

15. The device according to claim 14, the device further configured to:
determine a sixth coefficient from the information representative of the position of the elevator cabin,
multiply the signals transferred by the mobile terminal by the sixth coefficient, and
transfer the signals multiplied by the sixth coefficient to the third base station.

16. The device according to claim 15, wherein the device is further configured to receive, from an elevator controller, information representative of the position of the third floor, the third floor being another destination floor of the elevator cabin next to the destination of the elevator cabin.

17. The device according to the claim 15, wherein the fifth and sixth coefficients are determined from a variable $X_c$ calculated according to the following formula:

$$X_c = 0 \text{ if } |y_j - y| > |y_j - y_c|,$$

$$X_c = \left|\frac{y - y_c}{y_j - y_c}\right| \text{ if } |y_j - y| \leq |y_j - y_c|$$

wherein y is the position of the elevator cabin, $y_c$ is a third predetermined position and $y_j$ is the position of the third floor.

18. The device according to claim 17, wherein the fifth and sixth coefficients are calculated according to the following formula:
coeff$_{DL1}$=coeff$_{UL1}$=$X_c$ wherein, coeff$_{DL1}$ is the fifth coefficient and coeff$_{UL1}$ is the sixth coefficient.

19. The device according to claim 16, wherein the fifth and sixth coefficients are calculated according to the following formula:

$$\text{coeff}_{DL1} = \text{coeff}_{UL1} = 10^{-\Delta(1-X_c)/10},$$

with $\Delta$ is a predetermined value, coeff$_{DL1}$ is the fifth coefficient and coeff$_{UL1}$ is the sixth coefficient.

20. The device according to claim 17, wherein the third predetermined position is located between the position of the origin floor at which the elevator cabin previously stopped and the position of the destination floor or is a position at which information representative of the position of the third floor have been received or is the position of the origin floor at which the elevator cabin previously stopped.

21. The device according to claim 16, wherein the third floor is not another destination floor next to the destination of the elevator cabin and the fifth and sixth coefficients are equal to null value.

22. A method for assisting in reception, by a mobile terminal located in a moving conveyance, of signals transferred in at least a first cell and a second cell of a wireless cellular telecommunication network composed of plural base stations, the moving conveyance moving from a first area to a second area, the method comprising:
identifying a first base station which transfers signals in a first cell comprising the first area, identifying a second base station which transfers signals in a second cell comprising the second area, obtaining information representative of the position of the moving conveyance relative to its destination, determining a first coefficient and a second coefficient from the information representative of the position of the moving conveyance, obtaining signals transferred in the first and the second cells by the first and second base stations, multiplying the signals transferred in the first cell by the first coefficient and multiplying the signals transferred in the second cell by the second coefficient, combining the multiplied signals into combined signals, and transferring the combined signals to the mobile terminal located in the moving conveyance.

23. A non-transitory computer program loadable into a programmable device, comprising instructions or portions of code for implementing the method according to claim 22, when said computer program is executed on a programmable device.

* * * * *